(12) United States Patent
Tuchrelo et al.

(10) Patent No.: US 10,548,336 B2
(45) Date of Patent: Feb. 4, 2020

(54) ADAPTER AND FILLING NOZZLE FOR SELECTIVELY DISPENSING SOFT SERVE PRODUCT

(71) Applicant: Idea Boxx, LLC, Victor, NY (US)

(72) Inventors: Robert Tuchrelo, Williamson, NY (US); Nathan E. Smith, Hamlin, NY (US)

(73) Assignee: Idea Boxx, LLC, Victor, NY (US)

( * ) Notice: Subject to any disclaimer, the term of this patent is extended or adjusted under 35 U.S.C. 154(b) by 0 days.

(21) Appl. No.: 14/702,225

(22) Filed: May 1, 2015

(65) Prior Publication Data

US 2016/0316782 A1 Nov. 3, 2016

(51) Int. Cl.
| | |
|---|---|
| *A23G 9/28* | (2006.01) |
| *B05B 1/00* | (2006.01) |
| *A23G 9/30* | (2006.01) |
| *B05B 15/55* | (2018.01) |

(52) U.S. Cl.
CPC ............... *A23G 9/287* (2013.01); *A23G 9/30* (2013.01); *B05B 15/55* (2018.02)

(58) Field of Classification Search
CPC ... B65B 1/04; F28G 13/00; A23L 1/27; A23G 9/20; A23G 9/28; A23G 9/30; A23G 9/287; A21D 13/00; B05B 15/55; B05B 15/025
USPC .......... 222/148–151, 146.1, 146.6, 566–570, 222/575, 129.1, 511–518
See application file for complete search history.

(56) References Cited

U.S. PATENT DOCUMENTS

| | | | |
|---|---|---|---|
| 3,989,853 A | 11/1976 | Forkner | |
| 3,995,770 A * | 12/1976 | Schwitters | B67D 1/0016 222/129.1 |
| 4,020,188 A * | 4/1977 | Forkner | A21D 13/0032 426/438 |
| 4,068,007 A | 1/1978 | Forkner | |
| 4,104,405 A | 8/1978 | Forkner | |
| 4,171,380 A * | 10/1979 | Forkner | A23G 9/288 426/439 |
| 4,282,258 A | 8/1981 | Forkner | |
| 4,409,249 A | 10/1983 | Forkner | |
| 4,848,381 A * | 7/1989 | Livingston | A23G 7/00 134/100.1 |
| 5,400,614 A * | 3/1995 | Feola | A23G 9/163 366/102 |
| 5,410,888 A * | 5/1995 | Kaiser | A23G 9/20 251/30.01 |
| 5,494,194 A * | 2/1996 | Topper | A23G 9/28 222/146.6 |

(Continued)

FOREIGN PATENT DOCUMENTS

WO 20051020703 A1 3/2005

*Primary Examiner* — Paul R Durand
*Assistant Examiner* — Andrew P Bainbridge
(74) *Attorney, Agent, or Firm* — Brian B. Shaw, Esq.; Harter Secrest & Emery LLP (57) ABSTRACT

A nozzle assembly and adapter provided for selectively interconnecting to a soft serve dispenser to allow filling of farinaceous products such as donuts with a soft serve product. One of the adapter and the nozzle assembly can include a cleansing port for receiving a cleaning solution to allow periodic cleaning of the nozzle assembly. The nozzle assembly is separable from the adapter to permit the adapter to remain operably connected to the soft serve dispenser through which soft serve product can be dispensed.

13 Claims, 6 Drawing Sheets

(56) References Cited

U.S. PATENT DOCUMENTS

| | | | | |
|---|---|---|---|---|
| 5,524,683 A * | 6/1996 | Mueller | ............ | B65B 3/32 141/129 |
| 5,901,887 A * | 5/1999 | Wark | ............ | B65D 25/48 222/527 |
| 5,957,040 A * | 9/1999 | Feola | ............ | A23G 9/163 220/630 |
| D418,964 S * | 1/2000 | Biton | ............ | D1/120 |
| 6,119,905 A * | 9/2000 | Cocchi | ............ | A23G 9/281 222/509 |
| 6,264,066 B1 * | 7/2001 | Vincent | ............ | A23G 9/228 222/105 |
| 6,299,025 B1 * | 10/2001 | Watanabe | ............ | A23G 9/22 222/146.6 |
| 6,325,250 B1 | 12/2001 | Feola | | |
| 6,399,128 B1 * | 6/2002 | Ballesteros | ............ | A21D 13/0025 426/275 |
| 6,485,768 B2 | 11/2002 | Feola | | |
| 6,490,872 B1 | 12/2002 | Beck et al. | | |
| 6,553,779 B1 * | 4/2003 | Boyer | ............ | A23G 9/045 222/146.6 |
| 6,723,361 B2 | 4/2004 | Feola | | |
| 7,086,428 B2 * | 8/2006 | Schroeder | ............ | A23G 9/28 141/65 |
| 7,095,954 B2 * | 8/2006 | Esnault | ............ | A23G 1/042 222/146.5 |
| D543,471 S | 5/2007 | Hancock | | |
| 8,079,230 B2 * | 12/2011 | Frank | ............ | A23G 9/22 222/146.6 |
| 8,297,182 B2 * | 10/2012 | Cocchi | ............ | A23G 9/28 62/135 |
| 8,335,582 B2 | 12/2012 | Feola | | |
| 8,679,566 B1 | 3/2014 | Hancock | | |
| 8,893,926 B2 * | 11/2014 | Anderson | ............ | B67D 1/07 222/129.1 |
| 2002/0043075 A1 | 4/2002 | Feola | | |
| 2003/0077364 A1 | 4/2003 | Feola | | |
| 2003/0213519 A1 * | 11/2003 | Griffin | ............ | F16K 1/04 137/240 |
| 2004/0118291 A1 * | 6/2004 | Carhuff | ............ | A47J 31/401 99/275 |
| 2007/0262081 A1 | 11/2007 | Feola | | |
| 2009/0208271 A1 * | 8/2009 | Krohn | ............ | F16L 19/065 403/4 |
| 2010/0050655 A1 * | 3/2010 | Bravo | ............ | A23G 9/281 62/1 |
| 2011/0062183 A1 * | 3/2011 | Wiemer | ............ | B67D 1/045 222/95 |
| 2011/0266302 A1 * | 11/2011 | Masse | ............ | F16K 3/0209 222/1 |
| 2013/0064643 A1 * | 3/2013 | Vos | ............ | F04B 23/10 415/1 |
| 2013/0064943 A1 | 3/2013 | Feola | | |
| 2013/0196035 A1 * | 8/2013 | Passet | ............ | A23G 9/24 426/101 |
| 2014/0367424 A1 * | 12/2014 | Newton | ............ | A23G 9/281 222/482 |
| 2015/0086691 A1 * | 3/2015 | Binley | ............ | A23G 9/28 426/516 |
| 2015/0101638 A1 * | 4/2015 | Gonzalez | ............ | B67D 1/0084 134/18 |
| 2015/0157042 A1 * | 6/2015 | Amend | ............ | A23G 9/283 426/516 |
| 2016/0021911 A1 * | 1/2016 | Beuchert | ............ | B65B 25/005 141/1 |
| 2016/0316782 A1 * | 11/2016 | Tuchrelo | ............ | A23G 9/30 |
| 2018/0368441 A1 * | 12/2018 | Tuchrelo | ............ | A23G 9/30 |

* cited by examiner

ADAPTER AND FILLING NOZZLE FOR SELECTIVELY DISPENSING SOFT SERVE PRODUCT

BACKGROUND

Field

The present disclosure relates to the selective dispensing of a soft serve product and more particularly, to the selective dispensing of the soft serve product for at least partial encapsulation in a secondary food product such as farinaceous dough or baked product.

Description of Related Art

It has been found advantageous to selectively encapsulate, or at least partially encapsulate, a soft serve product within a cooked dough-based product such as a donut.

However, such encapsulation requires diversion of soft serve product from the normal dispensing route of the dispenser. Such diversion of the soft serve product introduces complications with presentation of the product as well as additional cleaning requirements of the dispenser.

Therefore, a need exists for an apparatus for the selective dispensing of soft serve product for encapsulation, or at least partial encapsulation in a separate food product, such as a farinaceous-based product.

BRIEF SUMMARY

In one aspect, a dispensing apparatus is provided for engaging a soft serve dispenser selectively dispensing a soft serve product, wherein the dispensing apparatus includes an adapter sealingly engaging the soft serve dispenser, the adapter having a through-port for the passage of soft serve product; a filling nozzle defining a flow path terminating at a filling port for the soft serve product, and a coupler releasably operably connecting the adapter to the filling nozzle to operably connect the through-port and the flow path.

In a further configuration, the disclosure provides a dispensing apparatus for engaging a soft serve dispenser selectively dispensing a soft serve product, the dispensing apparatus having an adapter sealingly releasably engaging the soft serve dispenser, the adapter having a through-port for the passage of soft serve product; and a coupling interface on the adapter, the coupling interface configured to form a sealed interface with at least one of a dispensing tube and a filling nozzle, wherein soft serve product passes from the soft serve dispenser, through the through-port and through the at least one of the dispensing tube and the filling nozzle.

A method is provided including engaging an adapter to an output of a soft serve dispenser; releasably coupling a filling nozzle with the adapter, the filling nozzle defining a flow path terminating at a filling port; passing a soft serve product from the soft serve dispenser, through the adapter, the filling nozzle and the filling port; and introducing a cleaning solution through a cleansing port in the filling nozzle.

A further method is provided engaging an adapter relative to an output of a soft serve dispenser, the adapter having a through-port for the passage of soft serve product; releasably engaging a filling nozzle with the adapter, the filling nozzle having a flow path and a filling port; passing a soft serve product from the soft serve dispenser, through the adapter, the filling nozzle and the filling port; disengaging the filling nozzle from the adapter; and passing the soft serve product from the soft serve dispenser, through the adapter.

DETAILED DESCRIPTION

The present dispensing system cooperatively engages a soft serve dispenser 10.

The soft serve dispenser 10 can be any of a variety of commercially available makes and designs for preparing and selectively dispensing soft desserts, typically frozen desserts, on demand. Typical commercially available machines include those by Taylor, Electro Freeze and SaniServe.

Typically, the soft serve dispensers 10 employ a mixture of milk products, sugar, gelatin, or similar thickener, flavors, coloring, nuts, fruits, syrups and sometimes eggs for both flavor and whipping ability. The ingredients are fed into a metal cylinder or mixing chamber which is chilled to impart the generation of ice crystals within the chamber, wherein the ice crystals are scrapped by a rotating blade on the interior of the chamber.

In many machines, the scraping assembly incorporates a beating arrangement that whips in air, thus increasing the volume of the mixture. The soft serve product is then selectively dispensed through a dispensing spout 12 under control of a valving system of the dispenser. The dispensing spout 12 can include a designer cap for imparting a given cross sectional area to the extruded soft serve product. It is understood the dispensing spout 12 can be formed by the soft serve dispenser or can formed by an intermediate interface. The intermediate interface can be an add-on to the soft serve dispenser 10 as either an original equipment component or a third party component. As used herein, the term dispensing spout 12 encompasses an orifice directly from the soft serve dispenser as well as from an intermediate interface. Thus, the term engaging the soft server dispenser includes directly engaging the soft serve dispenser as well as engaging an intermediate interface so as to be engaged relative to the soft serve dispenser.

Figure 1:
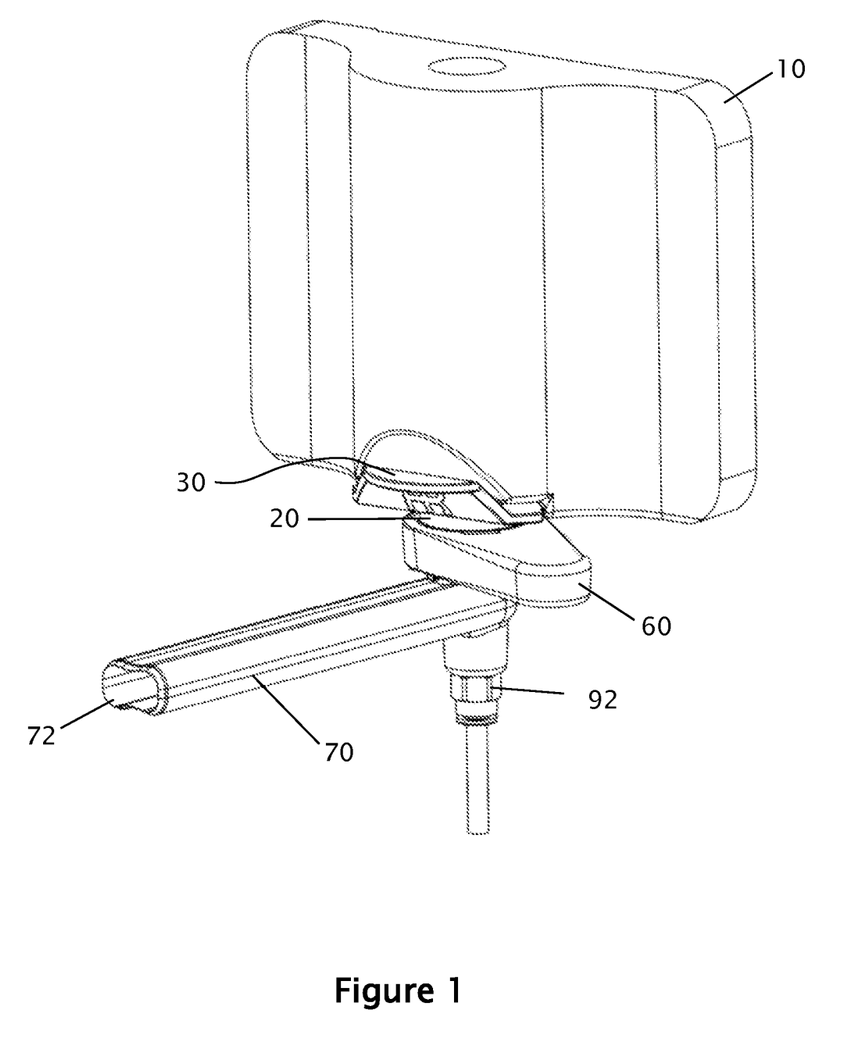
FIG. 1 is a perspective view of the present system operably connected to a schematically represented soft serve dispensing machine.
Figure 2:
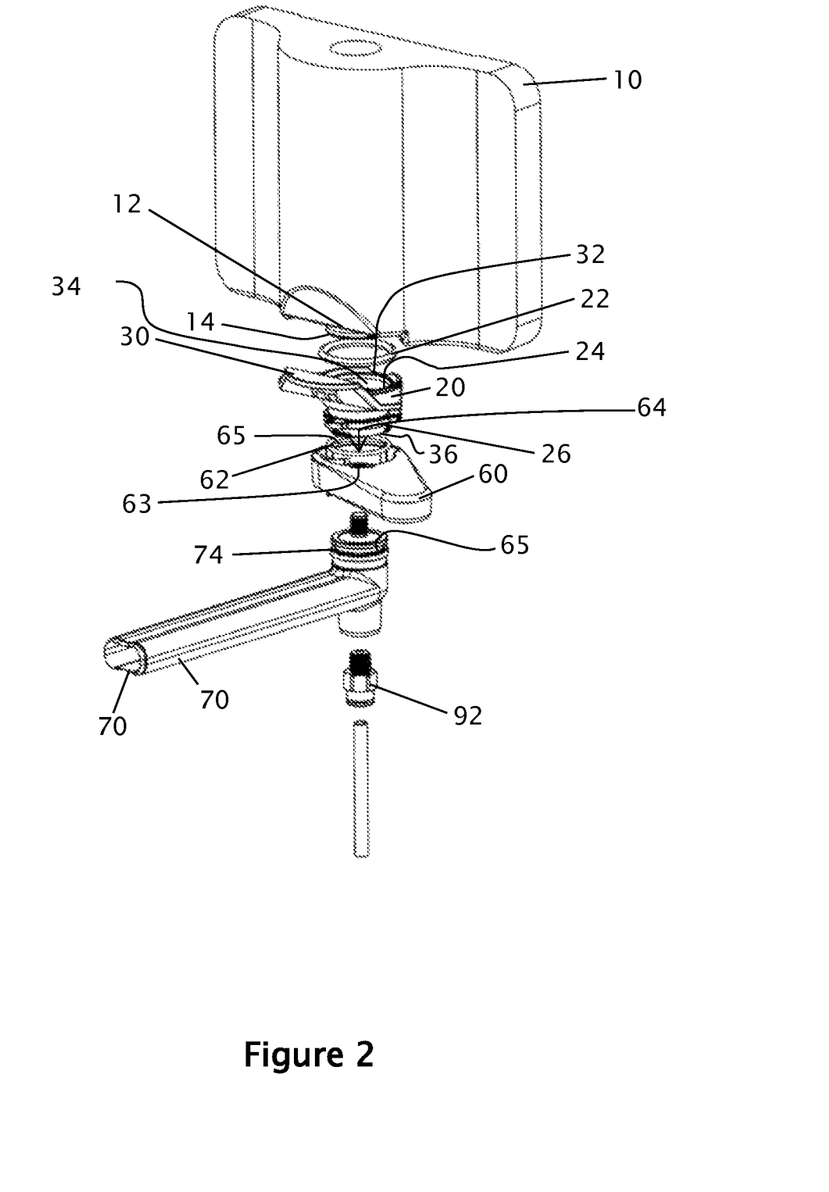
FIG. 2 is an exploded perspective of the assembly of FIG. 1.

Referring to FIG. 1, the present system incorporates an adapter 20, a coupler 60 and a filling nozzle 70, wherein the adapter is functionally located intermediate the filling nozzle and the dispensing spout 12 of the soft serve dispenser 10, seen in FIG. 2.

Figure 3:
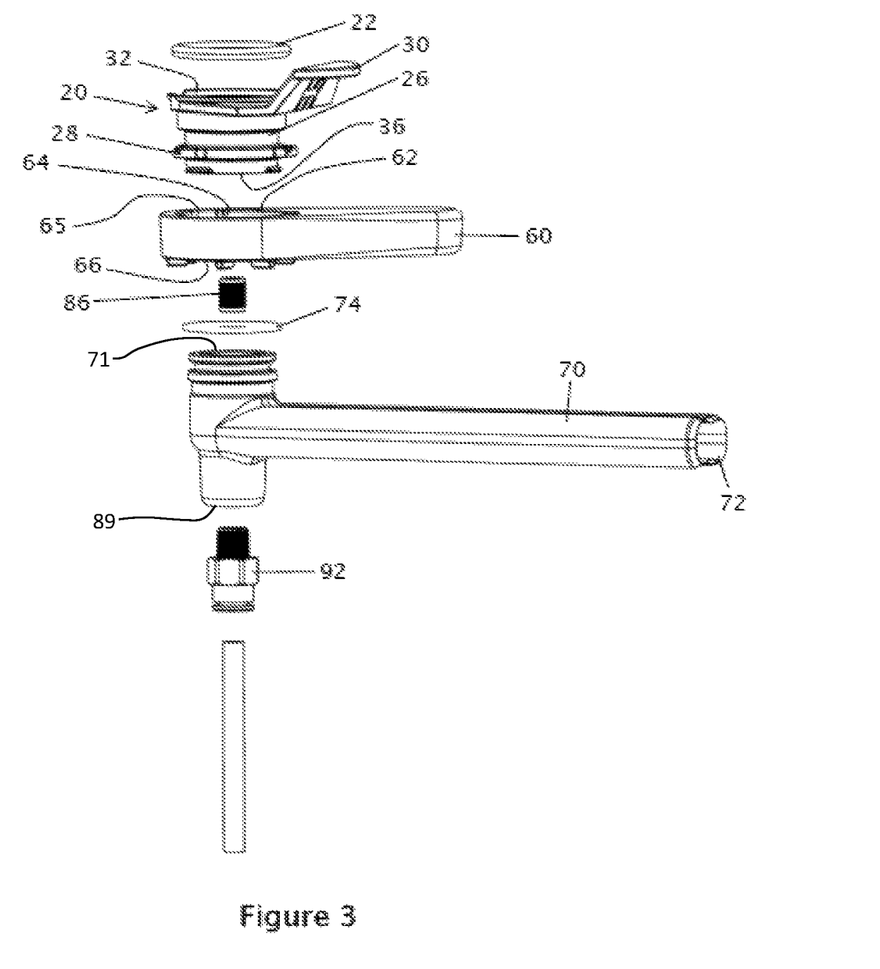
FIG. 3 is a side elevation exploded view of the components of the assembly.

Referring to FIGS. 2 and 3, the adapter 20 is configured to operably engage the dispensing spout 12. As set forth above, it is understood the dispensing spout 12 can be integral with the soft serve dispenser 10 or can be formed by the intermediate interface with the soft serve dispenser. Operable engagement with the soft serve dispenser 10 includes directly engaging the soft serve dispenser as well as engaging the intermediate interface so that the adapter 20 is engaged relative to the soft serve dispenser, or indirectly to the soft serve dispenser. The adapter 20 includes a mating interface 24 for mating with the soft serve dispenser 10. Typically, the dispensing spout 12 includes an annular or peripheral bead or ridge 14. The mating surface 24 of the adapter 20 is sized to mechanically engage the ridge 14 and substantially preclude unintended separation of the adapter and the soft serve dispenser 10.

The operable engagement of the adapter 20 and the soft serve dispenser 10 includes a sealed interface, wherein the sealed interface can be provided by any of a variety of configurations such as, but not limited to, friction fits, press fits or sealing rings 22 including O-rings or D-rings. The mechanical engagement of the adapter 20 and the soft serve dispenser 10 can include a detent, friction or snap fit, wherein a polymer material of the adapter can temporarily flex or deform to engage the soft serve dispenser.

The adapter 20 further includes a coupling interface 26 for releasably engaging the coupler 60 which operably connects the adapter relative to the filling nozzle 70.

In one configuration, the coupling interface 26 of the adapter 20 includes a plurality of projecting tabs 28, wherein the tabs can be asymmetrically located about a peripheral surface, thereby requiring a single or unique orientation of the adapter 20 to the coupler 60 and hence the filling nozzle 70. However, it is understood the coupling interface 26 can be configured to engage the coupler 60 and the filling nozzle 70 with the adapter 20 in a variety of orientations.

As seen in FIGS. 1-4, the adapter 20 can include a projecting lever 30 for applying sufficient force or torque to selectively separate the adapter from the soft serve dispenser 10.

The adapter 20 includes an inlet 32 and an outlet 36, interconnected by a through-port 34 for passing the soft serve product from the soft serve dispenser 10. In one configuration, the inlet 32 in conjunction with the sealing ring 22 forms the sealed interface with the dispensing spout 12 of the soft serve dispenser 10.

However, it is understood the respective tabs, grooves and slots can be exchanged between the adapter 20 and the coupler 60. That is, the adapter 20 can include the peripheral groove with axial slots and the coupler 60 can include the tabs.

In an alternative configuration, the adapter 20 includes a sealing surface for operably connecting with a downstream soft serve product guide, such as the filling nozzle 70 or a dispensing tube. The dispensing tube can be any of a variety of configurations, including but not limited to an elongate flexible, rigid or semi-rigid tube having a length from approximately an inch to 16 to 24 inches, depending upon the intended usage. The sealed interconnection of the dispensing tube and the sealing surface of the adapter 20 can be a friction fit, a pressure fit, a press fit or a mechanical interlock as known in the art.

Figure 7:
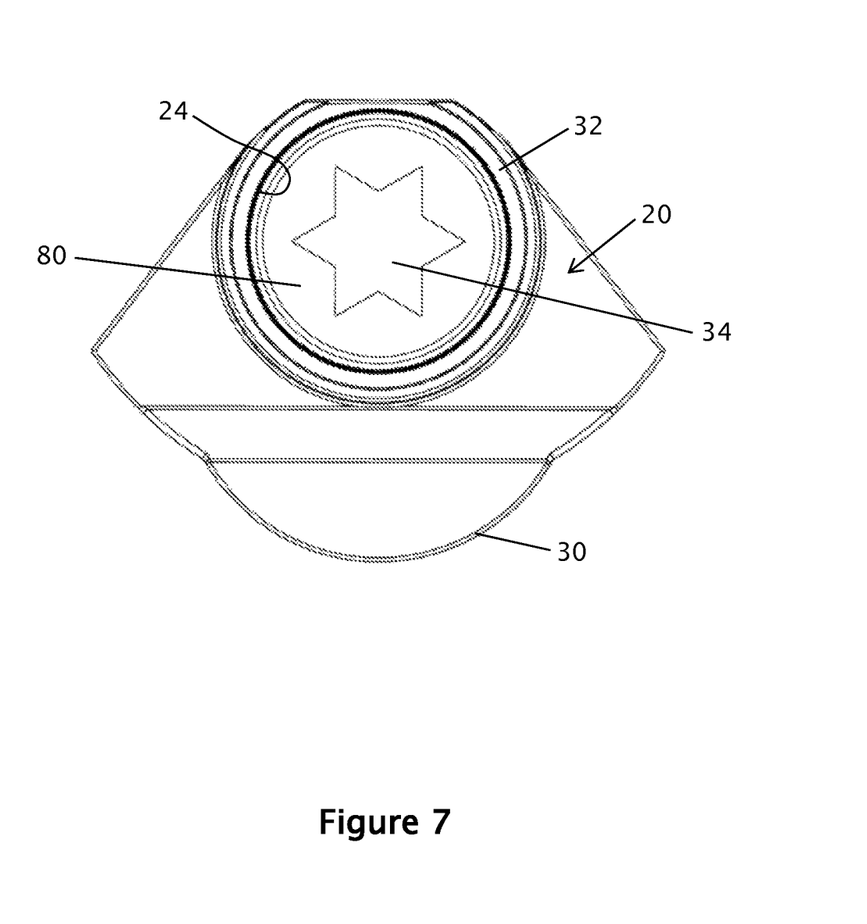
FIG. 7 is a top plan view of the adapter having a die for shaping the soft serve product.

In select configurations, one of the inlet 32, the outlet 36 and the through-port 34 of the adapter 20 can include a designer die 80 or profile shown in FIG. 7, selected to impart a pre-determined periphery or cross sectional configuration to the extruded soft serve product, such as a star cross section. Typically, the die 80 has a smaller cross sectional area than the inlet 32 and the outlet 36. The die 80 can be integral with the adapter 20 or can be a snap in disk that is press fit or friction fit into the adapter.

The coupler 60 cooperates with the filling nozzle 70 to operably locate filling nozzle relative to the adapter 20.

The coupler 60 includes a first end 62 for engaging the adapter 20 and a second end 66 for engaging the filling nozzle 70. In one configuration, the coupler 60 interconnects the adapter 20 to the filling nozzle 70, such that the adapter and the filling nozzle define a flow path of the soft serve product from the soft serve dispenser 10.

The first end 62 of the coupler 60 is sized to slidably receive a portion of the adapter 20 therein. In one configuration, the coupler 60 includes an inner periphery having a plurality of peripheral recesses or axial slots sized 63 to cooperatively align with the projecting tabs 28 of the coupling interface 26 of the adapter 20. The internal surface of the coupler 60 also includes an annular guideway 65 sized to permit rotation of the coupler relative to the adapter 20, for example upon axial translation of the tabs 28 to within the corresponding recesses of the coupler.

Thus, the coupler 60 can be axially translated relative to the adapter 20 with the tabs in the corresponding recesses and then rotated in the annular guideway to locate the tabs 28 against stops and operably engage the coupler to the adapter.

In select configurations, either the tabs 28 or the annular guideway 65 includes cammed surfaces 64 for imparting axial tension (or compression) between select portions of the adapter 20 and the coupler 60 to preclude unintended separation.

Referring to the Figures, the filling nozzle 70 extends from the coupler 60 to a filling port 72. Thus, the present system defines a flow path from the dispensing spout 12 of the soft serve dispenser 10, through the adapter 20 to the filling nozzle 70 and the filling port 72.

The filling nozzle 70 is rotatably connected the coupler 60 in a sealed relationship such as by sealing rings, O-rings or D-rings 74. Thus, the connection of the filling nozzle 70 to the coupler 60 can be independent of the connection of the coupler to the adapter 20.

As seen in the Figures, the filling nozzle 70 includes a peripheral channel or groove to operably receive correspondingly sized ribs of the coupler 60. In one configuration, a peripheral groove on an outer surface of the filling nozzle 70 receives a corresponding annular rib of the coupler 60.

Alternatively, it is contemplated the filling nozzle 70 can include a plurality of axial slots corresponding to a plurality of tabs on an inner surface of the coupler 60, for receiving the tabs along a longitudinal translation. The groove or channel in the filling nozzle 70 can extend about a portion of the periphery of the filling nozzle. Typically, the groove is of sufficient length to accommodate rotation of the filling nozzle relative to the coupler during the interconnect procedure.

As a further alternative, the releasable engagement of the filling nozzle 70 to the coupler 60 can include push-to-connect and quick connect fittings as known in the art.

The filling nozzle 70 can include a check valve 86 selectively admitting a solution from outside the flow path, such as a cleaning solution. In one configuration, the check valve 86 is located in or adjacent to a cleansing port 89. The cleansing port 89 can further include a connecter 92 for fluidly connecting a source of cleaning solution to the filling nozzle 70. The connecter 92 can be any of a variety of configurations, including but not limited to push to connect structures as known in the art.

In one configuration, the filling nozzle 70 includes the cleansing port 89 intermediate an inlet 71 of the filling nozzle and the filling port 72. The cleansing port 89 can be selectively closed by the check valve 86.

Figure 5:
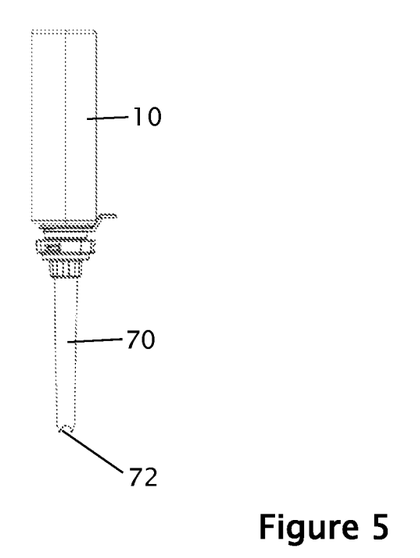
FIG. 5 is a side elevational view of an alternative construction of the nozzle assembly and adapter operably connected to a schematically represented soft serve dispensing machine.
Figure 6:
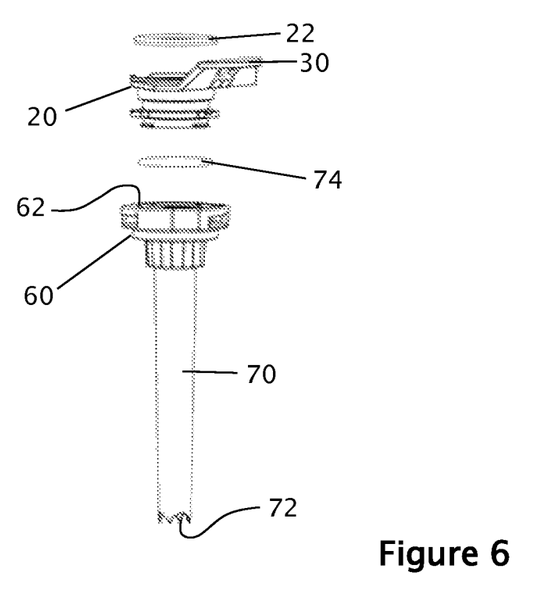
FIG. 6 is an exploded view of the nozzle assembly and adapter of FIG. 5.

In a further configuration, the filling nozzle 70 can be directly connected to the adapter 20, without employing the coupler 60. For example, the coupling interface 26 of the adapter 20 can be configured to cooperatively engage directly with the filling nozzle to define the flow path therebetween. Thus, the coupling interface 26 of the adapter 20 can include an inner annular ridge and groove for cooperatively engaging a corresponding annular ridge, or annular ridge and groove, on the filling nozzle 70, such as seen in FIGS. 5 and 6, wherein the filling nozzle operably snaps or presses into engagement with the adapter.

Further configurations for releasably and operably interconnecting the filling nozzle 70 to the adapter 20 can include bayonet, twist and lock and quick release.

In operation, the adapter 20 is cooperatively engaged with the soft serve dispenser 10. The soft serve dispenser 10 can then be operated in a traditional manner passing the soft serve product from the dispenser and through the adapter 20 into a traditional dish or cone.

In those configurations in which the adapter 20 includes the designer die 80, the passing soft serve product acquires the corresponding cross section, such as a star.

To fill a baked product, the coupler 60 is then engaged with the adapter 20.

The filling nozzle 70 is cooperatively engaged with the adapter 20 by the coupler 60. The flow path is thus formed from the dispensing spout 12 through the adapter 20 to the filling nozzle 70 to the filling port 72.

The filling port 72 is at least partially disposed within the baked product, such as a donut, and the soft serve dispenser 10 is operated to extrude soft serve product through the dispensing spout 12 and ultimately through the filling nozzle 70, the filling port 72, and into the baked product.

Upon sufficient soft serve product being located within the baked goods, or donut, the dispensing valve of the soft serve dispenser 10 is moved to the closed position and the filled baked product removed from the filling nozzle 70.

Cleaning of the filling nozzle 70 is accomplished by connecting a cleaning solution source to the cleansing port 89 and applying a sufficient pressure to force the cleaning solution into the filling nozzle 70, wherein the cleaning solution ultimately passes from the filling port 72. Alternatively, the filling nozzle 70 can be readily disengaged from the coupler 60, or both the filling nozzle and the coupler can be disengaged from the adapter 20, and can be cleaned by any traditional manner such as soaking, steaming, or dish washers. It is also contemplated each of the adapter 20, the coupler 60 and the filling nozzle 70 can be disengaged from the soft serve dispenser 10 and independently washed, cleaned and rinsed.

Figure 4:
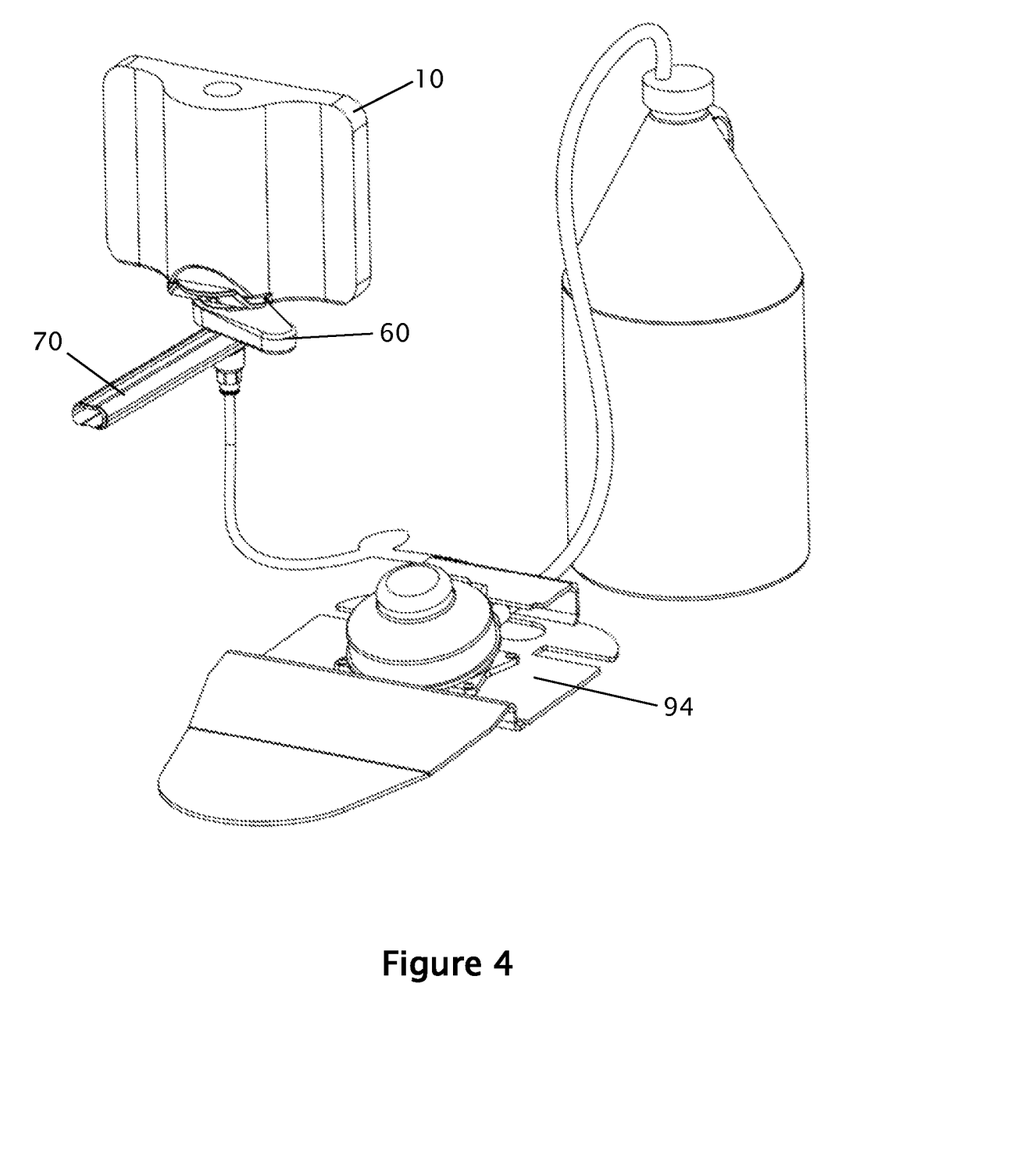
FIG. 4 is a perspective view of the assembly operably connected to a source of cleaning solution.

The cleaning solution can be supplied by any of a variety of mechanisms including a manually operated pressure or a public water line pressure. The cleaning solution can include cleaning agents added to the motive fluid by any of a variety of mechanisms including venturi, metering, manual or pumps. As seen in FIG. 4, a manually operated pump 94, such as a foot pump, is connected to a solution, such as a wash solution to selectively draw the wash solution from a reservoir through a cleaning line and into the filling nozzle 70.

Referring to FIGS. 5 and 6, an alternative configuration of the adapter 20, the coupler 60 and the filling nozzle 70 is shown, wherein the coupler and the filling nozzle are integral. That is, the coupler 60 and the filling nozzle 70 are functionally assembled or constructed as a single unit.

The adapter 20 is as set forth above and shown in FIGS. 1-4 cooperatively engages the soft serve dispenser 10.

As in prior configurations, the adapter 20 can include the designer die or profile 80, selected to impart a pre-determined periphery or cross sectional configuration to the extruded soft serve product, such as a star cross section.

In this alternative configuration, the coupler 60 and the filling nozzle 70 are integrally connected. Further, in one aspect of this configuration the filling nozzle 70 does not include the cleansing port 89 or the check valve 86. However, it is contemplated the integral coupler 60 and filling nozzle 70 can include a cleansing port 89 as described above.

In one configuration, the filling nozzle 70 defines a straight flow path from the adapter 20 to the filling port 72. The straight flow path can be vertically oriented. It is contemplated that at least an outside dimension of the filling nozzle 70 tapers from the coupler 60 to the filling port 72. The filling port 72 can define a scalloped or multipoint terminal end for at least partial penetration of the food product into which the soft serve product is to be introduced.

The removable interconnection of the coupler 60 and the adapter 20 is as set forth above in connection with FIGS. 1-4.

In operation of the second configuration, the sealed interface between the soft serve dispenser 10 and the adapter 20 is formed by any of a variety of configurations such as, but not limited to, friction fits as well as sealing rings 22 including O-rings or D-rings. The mechanical engagement of the adapter 20 and the soft serve dispenser 10 can include a detent, friction or snap fit, wherein the polymer material of the adapter can temporarily flex or deform to engage the soft serve dispenser.

As set forth above, the adapter 20 includes the coupling interface 26 for releasably engaging the coupler 60.

The sealed interface between the adapter 20 and the filling nozzle 70 can also be formed by any of a variety of configurations such as, but not limited to, friction fits as well as sealing rings 74 including O-rings or D-rings.

The coupler 60 is initially engaged with the adapter 20 by locating the tabs 28 of the adapter within the corresponding slots 63 in the coupler 60 to locate the tabs within the groove 65. The coupler 60 is then rotated relative to the adapter 20 to translate the tabs of the coupler within the groove of the adapter to interconnect the coupler having the filling nozzle 70 and the adapter.

In operation of a further alternative configuration, the adapter 20 is cooperatively engaged with the soft serve dispenser 10. The soft serve dispenser 10 can then be operated in a traditional manner passing the soft serve product from the dispenser and through the adapter 20 into a traditional dish or cone.

In those configurations in which the adapter 20 includes the designer die 80, the passing soft serve product acquires the corresponding cross section, such as a star.

The filling nozzle 70 is then operably engaged directly with the coupling surface of the adapter 20, to form a sealed interface and the flow path from the soft serve dispenser 10 to the filling port 72.

In operation of a still further configuration, the dispensing tube is engaged with the sealing surface of the adapter 20, and the soft serve product passes from the soft serve dispenser, through the adapter and directly into the dispensing table.

The present system has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the disclosure is indicated by the appended claims, and all the changes that come within the meaning and range of equivalence are intended to be embraced therein.

The invention claimed is:

1. A dispensing apparatus for engaging a soft serve dispenser, the soft serve dispenser having a dispensing spout and a dispensing valve for selectively dispensing a soft serve product through the dispensing spout, the dispensing apparatus comprising:
   (a) an adapter having a mating surface adapted to sealingly and releasably engage the soft serve dispenser at a sealed interface, the adapter further having a coupling interface and a through-port fluidly connected to the dispensing spout for the passage of soft serve product;
   (b) a filling nozzle defining a flow path extending from an inlet of the filling nozzle to an outlet of the filling nozzle, the flow path terminating at a filling port for the soft serve product, wherein the filling nozzle includes a check valve intermediate the inlet and the outlet; and
   (c) a coupler releasably and rotatably connecting the adapter to the filling nozzle to operably connect the through-port and the flow path, and the coupler rotatably connected to the filling nozzle.

2. The dispensing apparatus of claim 1, wherein at least one of the filling nozzle and the adapter includes a cleansing port configured to introduce a solution into the one of the filling nozzle and the adapter.

3. The dispensing apparatus of claim 1, wherein the adapter includes a die in the through-port forming a predetermined periphery of the passing soft serve product.

4. The dispensing apparatus of claim 1, wherein the filling nozzle releasably engages the coupler by a combination of axial translation and rotation.

5. The dispensing apparatus of claim 1, wherein the filling nozzle includes a closable cleansing port and further comprising a cleaning solution reservoir fluidly connected to the cleansing port.

6. The dispensing apparatus of claim 1, wherein the filling nozzle includes a cleansing port.

7. A dispensing apparatus for engaging a soft serve dispenser, the soft serve dispenser having a dispensing spout aligned along a longitudinal axis and a dispensing valve for selectively dispensing a soft serve product through the dispensing spout, the dispensing apparatus comprising:
   (a) an adapter sealingly and releasably engaging the soft serve dispenser, the adapter having an inlet and an outlet fluidly connected by a through-port for the passage of soft serve product;
   (b) a coupling interface on the adapter, the coupling interface configured to form a rotatable sealed interface with at least one of a dispensing tube and a filling nozzle, the filling nozzle comprising a cleansing port, wherein soft serve product passes from the soft serve dispenser, through the through-port and through the at least one of the dispensing tube and the filling nozzle; and
   (c) a cleaning solution reservoir detachably and fluidly connected to the cleansing port of the filling nozzle.

8. The dispensing apparatus of claim 7, wherein the adapter includes a die for defining a cross sectional profile of the extruded soft serve product.

9. The dispensing apparatus of claim 7, wherein the filling nozzle includes an inlet for receiving the soft serve product into the filling nozzle, an outlet for passing the soft serve product from the nozzle and a flow path fluidly connecting the inlet and the outlet, wherein the flow path extends straight from the inlet to the outlet.

10. The dispensing apparatus of claim 7, wherein the cleansing port is aligned along the longitudinal axis of the dispensing spout.

11. A method comprising:
   (a) engaging an adapter to an output of a soft serve dispenser;
   (b) releasably coupling a filling nozzle with the adapter, the filling nozzle defining a flow path extending from a filling nozzle inlet and terminating at a filling port;
   (c) passing a soft serve product from the soft serve dispenser, through the adapter, the filling nozzle and the filling port; and
   (d) introducing a cleaning solution through a closable cleansing port in the filling nozzle, the cleansing port located intermediate the filling nozzle inlet and the filling port, wherein the cleansing port includes a check valve.

12. A method comprising:
   (a) releasably engaging an adapter to a dispensing spout of a soft serve dispenser, the adapter being aligned along a longitudinal axis, the adapter having an inlet and an outlet fluidly connected by a through-port for the passage of soft serve product;
   (b) releasably and rotatably engaging a coupler to the adapter;
   (c) releasably and rotatably engaging a filling nozzle to the coupler, the filling nozzle having a flow path and a filling port, the filling nozzle comprising a cleansing port;
   (d) passing a soft serve product from the soft serve dispenser, through the adapter, the coupler, the filling nozzle, and the filling port;
   (e) disengaging the filling nozzle from the coupler;
   passing the soft serve product from the soft serve dispenser, through the adapter; and
   (g) passing a cleaning solution through the cleansing port of the filling nozzle from a cleaning solution reservoir detachably and fluidly connected to the cleansing port of the filling nozzle.

13. The method of claim 12, wherein the cleansing port is aligned along the longitudinal axis of the dispensing spout.

* * * * *